United States Patent [19]

Gentry et al.

[11] Patent Number: 5,281,881
[45] Date of Patent: Jan. 25, 1994

[54] FRAME AND MAGNET ASSEMBLY FOR A DYNAMOELECTRIC MACHINE

[75] Inventors: Ronald D. Gentry, Cicero; Kenneth P. Heuer, Greenfield; Richard A. Van Sickle, Anderson, all of Ind.

[73] Assignee: General Motors Corporation, Detroit, Mich.

[21] Appl. No.: 22,585

[22] Filed: Feb. 25, 1993

[51] Int. Cl.$^5$ .............................................. H02K 1/18
[52] U.S. Cl. ...................................... 310/154; 310/42; 310/89; 310/91; 310/258
[58] Field of Search ................... 310/154, 156, 88, 89, 310/91, 42, 258; 335/302, 303, 306

[56] References Cited

U.S. PATENT DOCUMENTS

| | | | |
|---|---|---|---|
| 3,772,546 | 11/1973 | Means | 310/154 |
| 3,789,250 | 1/1974 | Macoit | 310/154 |
| 3,790,830 | 2/1974 | Bonfiglio | 310/42 |
| 4,587,449 | 5/1986 | West | 310/154 |
| 4,769,624 | 9/1988 | Merritt et al. | 335/302 |
| 5,105,114 | 4/1992 | Sickle et al. | 310/154 |

FOREIGN PATENT DOCUMENTS

| | | | |
|---|---|---|---|
| 1613367 | 6/1970 | Fed. Rep. of Germany | 310/154 |
| 1924473 | 11/1970 | Fed. Rep. of Germany | 310/154 |
| 2282182 | 3/1976 | France | 310/154 |

*Primary Examiner*—R. Skudy
*Attorney, Agent, or Firm*—Creighton R. Meland; A. Luke Simon

[57] ABSTRACT

A frame and magnet assembly for a dynamoelectric machine. The assembly includes an imperforate frame member formed of metallic magnetic material. A one-piece tubular imperforate stainless steel magnet supporting part is disposed within the frame. The magnet supporting part has pockets that contain permanent magnets. The opposite ends of the frame have annular chamfered or tapered surfaces which intersect a tubular inner surface of the frame to define annular ridges. Annular end portions of the magnet support are bent into engagement with the tapered surfaces on the frame to thereby provide ridges on the magnet support that are aligned with the ridges on the frame. The ridges on the frame are welded to the ridges on the magnet support by a welding current that is supplied to a pair of welding electrodes that respectively engage the ridges on the magnet support. The welding electrodes have annular tapered surfaces which have line contact with the ridges on the magnet support.

4 Claims, 2 Drawing Sheets

FRAME AND MAGNET ASSEMBLY FOR A DYNAMOELECTRIC MACHINE

This invention relates to a frame and magnet assembly for a dynamoelectric machine and to the method of manufacture of the assembly.

U.S. Pat. No. 5,105,114 granted on Apr. 14, 1992 discloses a frame and magnet assembly for a dynamoelectric machine. In that patent, a one-piece tubular magnet retainer is disposed within a tubular frame. The magnet retainer has pockets that receive permanent magnets. The end flanges of the magnet retainer are seam welded to the frame. The seam welds are continuous and form joints or welds that provide an imperforate hermetic seal.

This invention is an improvement of the frame and magnet assembly shown in above-referenced U.S. Pat. No. 5,105,114.

The frame and magnet assembly of this invention uses a frame, the opposed ends of which have annular chamfered or tapered surfaces. The intersection of the circular inner surface of the frame and the chamfered or tapered surface on the frame define a ring-shaped projection or annular ridge. The magnet retainer has end portions that engage the tapered surfaces on the frame. The intersection of these end portions and the circular inner surface of the magnet retainer provide annular ridges. The annular ridges on the magnet retainer are aligned with the annular ridges on the frame and are welded to the annular ridges on the frame throughout the entire circumference of the annular ridges.

In accordance with another aspect of this invention, a new and improved method of welding a magnet retainer to the tubular frame is provided. In accordance with this aspect of the invention, a tubular metallic frame is provided. The opposite ends of the frame are machined to provide annular chamfered or tapered surfaces. The intersection of the chamfered or tapered surfaces and the internal annular surface of the frame define annular ridges. A magnet retainer is inserted into the tubular frame. The ends of the magnet retainer are now bent, for example by a roll forming operation, into engagement with the chamfered surfaces. This forms annular ridges on the magnet retainer that are aligned with annular ridges on the frame. A pair of opposed resistance welding electrodes are now moved into engagement with the ridges on the magnet retainer. The ends of the welding electrodes are tapered and the taper on the welding electrodes relative to the taper of the tapered surfaces on the tubular frame is such that the electrodes have annular line contact with the ridges on the magnet retainer over a circular area that is aligned with the annular ridge on the frame. A welding current is now applied to the welding electrodes to cause the ridges on the magnet retainer to be welded to the annular projections or ridges on the frame. These welds are imperforate so that they provide a seal that is impervious to moisture or the like.

IN THE DRAWINGS

Figure 1:
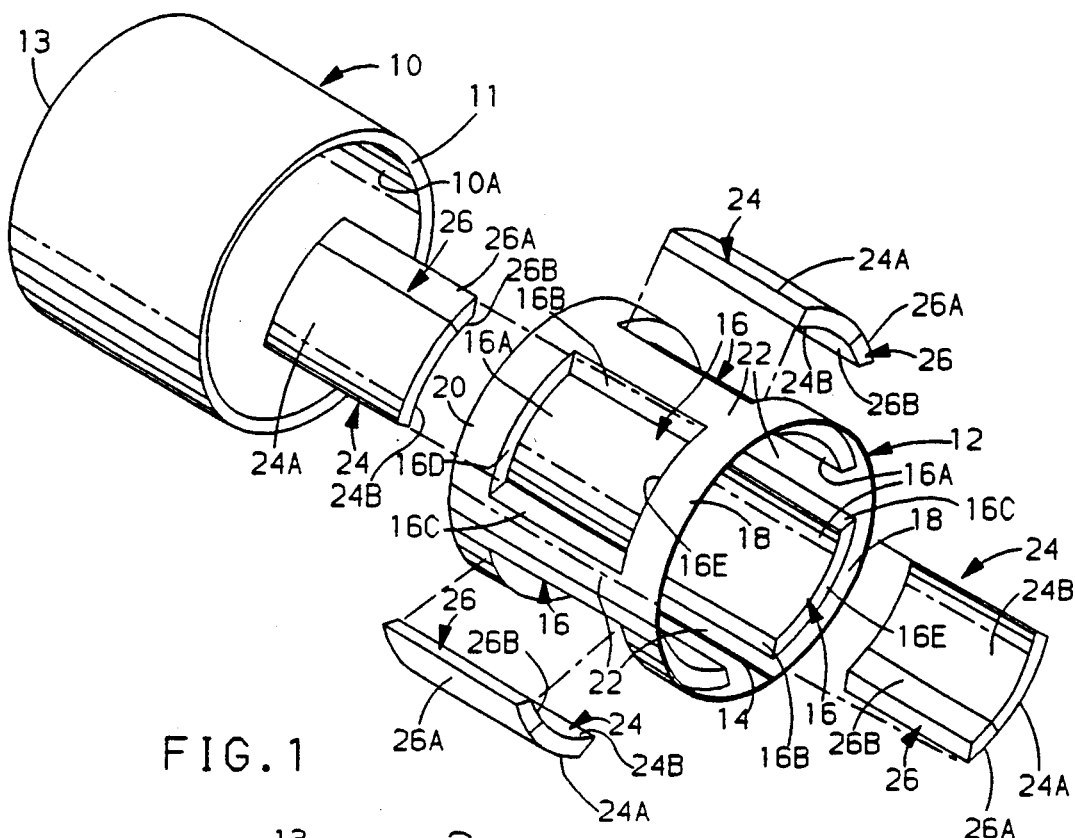
FIG. 1 is an exploded perspective view illustrating the parts that make up the frame and magnet assembly of this invention.

Referring now to the drawings and more particularly to FIG. 1, the reference numeral 10 designates a frame for a dynamoelectric machine. This frame is tubular and imperforate and is formed of a magnetic material such as steel. The frame may be part of an electric cranking motor for an electric engine starter. The frame 10 has an internal circular surface or wall 10A. The ends of frame 10 have chamfered or tapered annular conical surfaces 11 and 13 that are located at an acute angle to the longitudinal axis of frame 10.

The frame and magnet assembly utilizes a one-piece tubular permanent magnet retainer or support generally designated as 12. This retainer or support part 12 is formed of an imperforate metallic nonmagnetic material. By way of example, part 12 can be formed of a nonmagnetic stainless steel, for example, AISI 302 stainless steel. The thickness of tubular part 12 may be about 0.005 inches. The part 12 has an axially extending seam weld 14 which is made when the part 12 is made. The seam weld 14 joins opposed edges of part 12 when the part is rolled up into its tubular shape. The seam weld 14 is continuous and imperforate and extends the entire length of part 12.

The part 12 has four circumferentially spaced pockets or recesses each generally designated as 16. Since these pockets are identical, only one of the pockets 16 will be described in detail. Each pocket 16 is defined by an inner arcuately extending wall 16A and four generally radially extending walls 16B, 16C, 16D, and 16E. As will be described, the pockets 16 are shaped to receive a permanent magnet and a shunt member. The part 12 has opposed circular flanges or rims 18 and 20 located respectively at opposite ends of part 12. The portions of part 12 that define the pockets 16 are joined by arcuately extending portions 22.

The frame and magnet assembly has four permanent magnets, each designated as 24 and four magnetic shunts each designated as 26. Permanent magnets 24 have opposed arcuate end surfaces or faces 24A and 24B and shunts 26 have opposed and arcuate surfaces or faces 26A and 26B. The arcuate surfaces of the permanent magnets and shunts are complementary to the shape of pocket walls 16A and the internal surface 10A of frame 10. The permanent magnets may be of the iron-neodymium-boron type which can corrode if subjected to a corrosive substance. The shunts 26 are formed of a magnetic material such as iron.

The manner in which the magnet retainer 12 is welded to the frame 10 will now be described. Prior to welding, the permanent magnets and shunts are inserted into the pockets. The magnet retainer is now inserted into frame 10 to the position shown in FIG. 2. With the retainer in the position shown in FIG. 2, an annular portion 28 of rim 18 of retainer 12 is bent or forced into engagement with the chamfered surface 11 on frame 10. This can be accomplished by roll-forming portion 28 into engagement with chamfered surface 11 by means of a roller that is rotated against portion 28. When portion 28 is bent or roll-formed to the position shown in FIG. 2, it can be seen that an annular ridge 30 is formed. The ridge 30 is aligned with the annular ridge or projection 32 on frame 10 that is defined by the intersection of circular surface 10A and annular tapered surface 11.

The annular portion 34 of rim 20 of magnet retainer 12 is likewise bent into engagement with the chamfered or tapered surface 13 of frame 10. When portion 34 is bent or roll-formed to the position shown in FIG. 2, it can be seen that an annular ridge 36 is formed on retainer 12. The ridge 36 is aligned with the annular ridge or projection 38 that is defined by the intersection of circular surface 10A and annular tapered surface 13.

Figure 2:
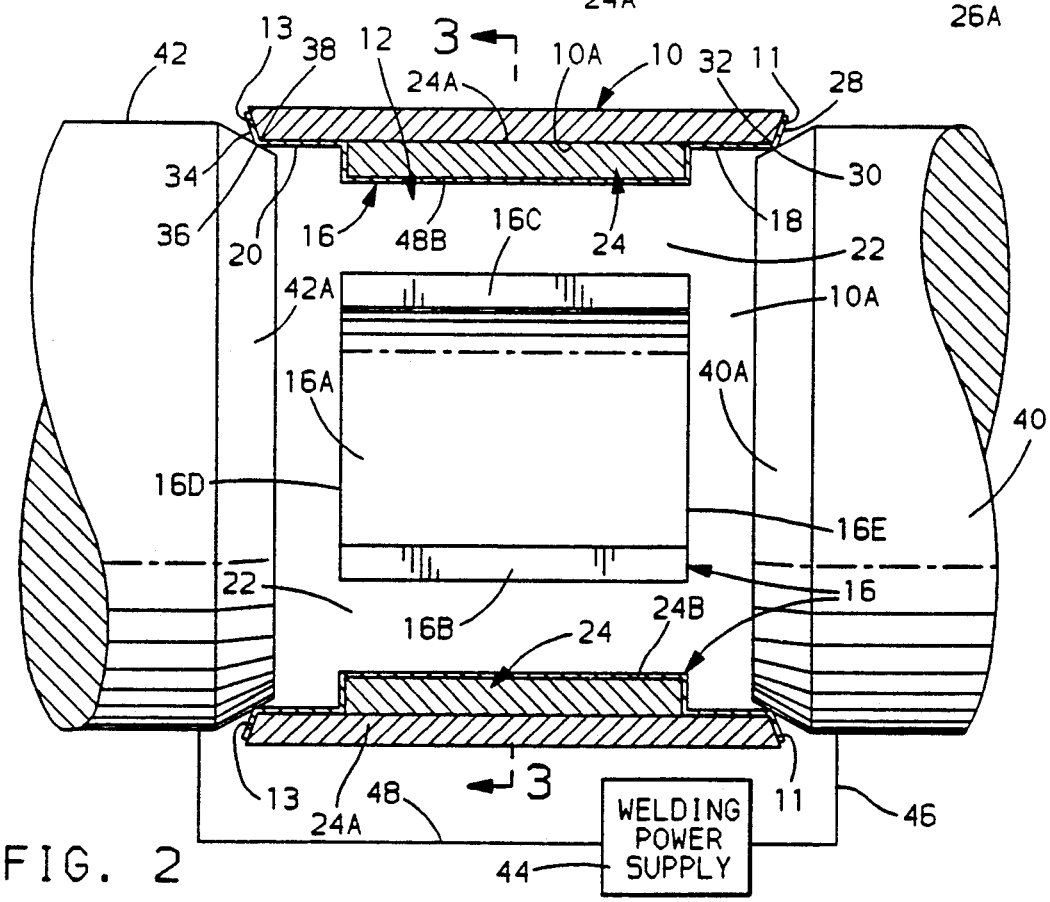
FIG. 2 illustrates welding apparatus for welding a magnet retainer to a tubular frame.
Figure 3:
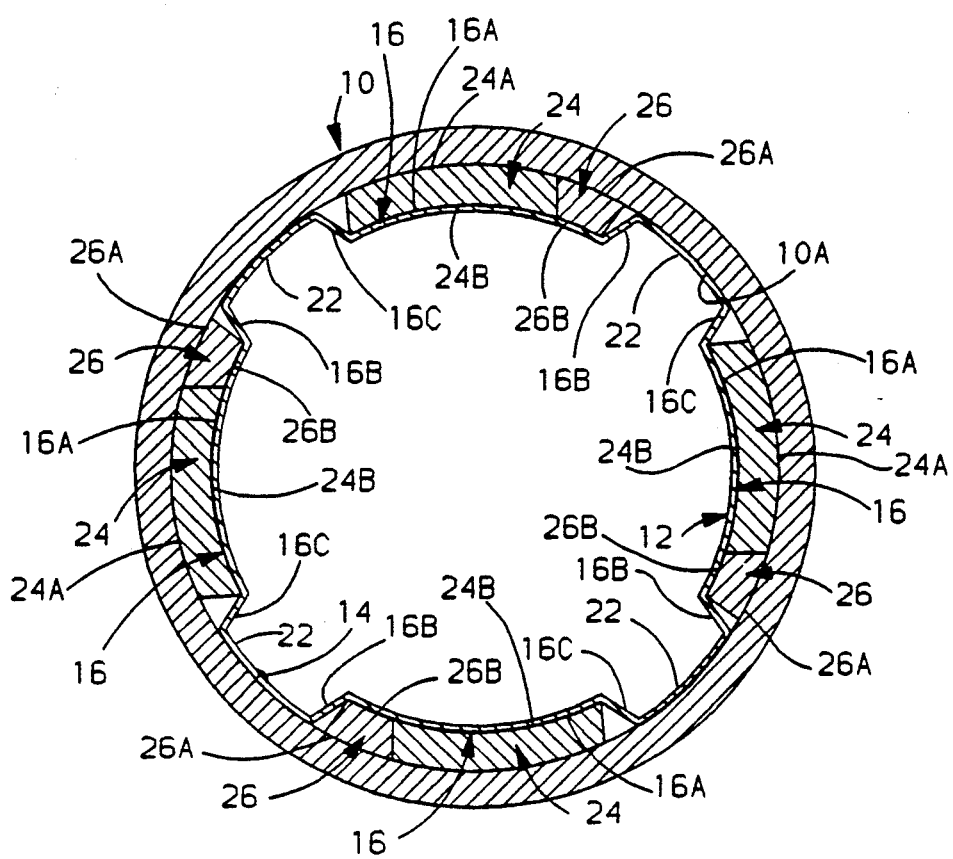
FIG. 3 is a sectional view taken along lines 3—3 of FIG. 2.

With the parts positioned as shown in FIG. 2, welding electrodes 40 and 42 are moved respectively into engagement with ridges 30 and 36 on magnet retainer 12. The welding electrode 40 has an annular chamfered or tapered conical surface 40A that engages ridge 30. There is only annular line contact between an annular portion of surface 40A of electrode 40 and ridge 30 on retainer 12. This is because the surface 11 on frame 12 and consequently the outer surface of portion 28 are not parallel to surface 40A of electrode 40. Putting it another way, the angles of surfaces 11 and 40A are not the same. Thus, the angle between a line (not illustrated) that is parallel to surface 11 and a center line or longitudinal axis of frame 10 and electrode 40 is larger than the angle between a line (not illustrated) that is parallel to surface 40A and the center line or longitudinal axis of frame 10 and electrode 40. Further, surface 40A is substantially perpendicular to a line (not illustrated) extending through aligned ridges 30 and 32.

The electrode 42 has an annular chamfered or tapered conical surface 42A which has the same angle relative to the longitudinal axis of electrode 42 as the angle of surface 40A. When electrode 42 is moved into engagement with magnet retainer 12, it engages the ridge 36. There is only annular line contact between an annular portion of surface 42A of electrode 42 and ridge 36 on retainer 12. This is because the surface 13 on frame 12 and consequently the outer surface of portion 34 are not parallel to surface 42A of electrode 42. Putting it another way, the angle of surfaces 13 and 42A are not the same. The angle of surface 13 relative to the longitudinal axis of frame 10 is the same as the angle of surface 11.

The electrodes 40 and 42 can be moved from a retracted position to the position shown in FIG. 2 by air cylinders, which have not been illustrated. In the welding position of the electrodes, shown in FIG. 2, the air cylinders apply force or pressure to welding electrodes 40 and 42 which causes the tapered surface 40A of electrode 40 to tightly engage ridge 30 in line contact and causes the retainer to tightly engage ridge 32. Further, the tapered surface 42A is forced into line contact engagement with ridge 34 and causes the retainer to tightly engage ridge 38 on frame 10.

With pressure applied to welding electrodes 40 and 42 to force the electrodes toward each other, an alternating welding current is applied to electrodes 40 and 42 from an alternating current welding power supply 44. The power supply is electrically connected to electrode 40 by a conductor 46 and is electrically connected to electrode 42 by a conductor 48. The rating of the power supply may be about 200 KVA and during the welding of the magnet retainer to the frame about 64,000 amps are used. The electrodes 40 and 42 may be class eleven copper-tungsten electrodes.

Figure 4:
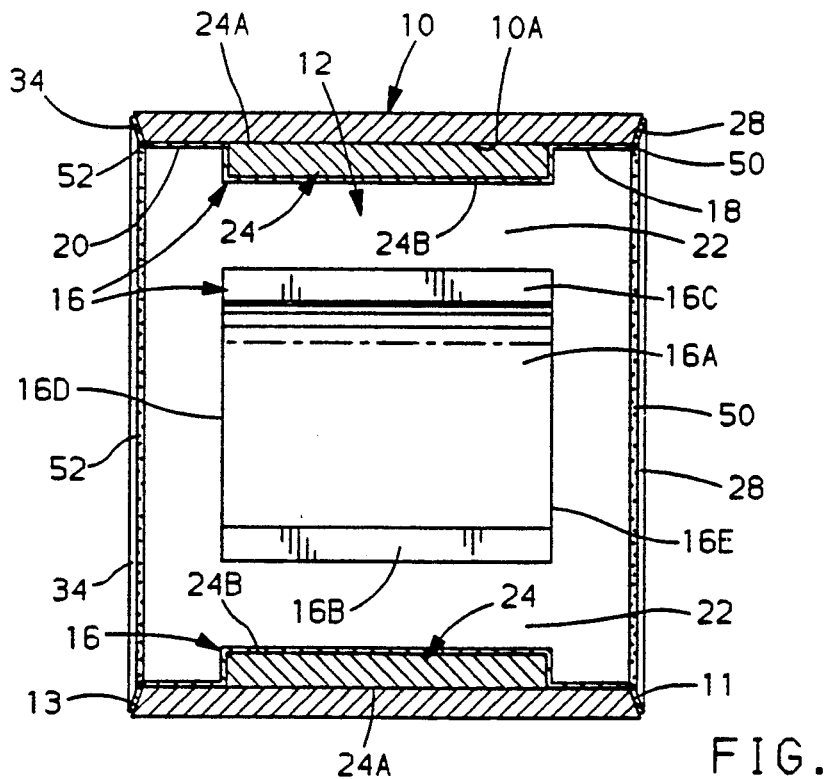
FIG. 4 is a sectional view of a field and frame assembly made in accordance with this invention and illustrating the magnet retainer welded to the tubular frame.

When welding current is applied to electrodes 40 and 42, two imperforate annular welds are produced which are shown in FIG. 4 and designated respectively as 50 and 52. Welding current flows, for example, from conductor 48 to surface 42A of welding electrode 42 then through ridges 36 and 38 to frame 10, through frame 10, then through ridges 32 and 30 to surface 40A of welding electrode 40 and then to conductor 46. The current that passes through ridges 36 and 38 is localized by the ridges so that only the material of the ridges is heated to a molten state to form the weld. As the ridges are heated by the electric welding current, some of the molten material flows very slightly toward both sides of the ridges. A narrow weld is made which is slightly wider than the ridges. The weld that is formed between ridges 32 and 30 is the same as the weld that has just been described between ridges 36 and 38.

The welding method that has been described can be characterized as a projection resistance welding process since ridge 32 and 38, in effect, provide projections that localize welding current.

The projection welds 50 and 52 that are formed extend continuously for 360 degrees. These welds, therefore, form continuous imperforate joints or welds that provide an impervious hermetic seal at each end of magnet retainer 12. Thus, the welds 50 and 52 will not permit corrosive substances, such as salt spray, to enter part 12 and accordingly no corrosive substance can contact permanent magnets 24. The permanent magnets are totally hermetically encapsulated or enclosed by frame 10, welds 50 and 52 and part 12.

The frame and magnet assembly of this invention is intended to be used as a field assembly for providing magnetic flux to a direct voltage electric cranking motor. In such use, the armature of the motor rotates within part 12 and the frame 10 is secured to end frames of the cranking motor.

The permanent magnets 24 can be magnetized after part 12 has been welded to frame 10. This procedure eliminates the problem of magnetizing the magnets with the wrong polarity and also eliminates the problem of the frame picking up metallic particles prior to final assembly. After magnetization, the opposed end faces 24A and 24B of a magnet have opposite magnetic polarities.

It will be appreciated that this invention can be used in field assemblies that do not use shunt such as the shunts 26. If shunts are not used, the pockets 16 are shaped to accommodate only permanent magnets.

Some of the advantages of the welding process that have been described are listed as follows:

1. The ring projection like, for example, ridge 32 remains in the center of the fused weld zone. Any pinholes developed in magnetic retainer 12 caused by expulsion at the peak of ridge 32 will be completely surrounded by good fused metal, since the fused metal tends to flow slightly to both sides of the peak.

2. The open ends of the magnet retainer can be easily rolled over the ring projections like ridge 32, into engagement with the chamfered surfaces like surface 11, thus locking the magnetic retainer in place prior to the welding operation.

3. The magnet retainer centers itself as the electrodes move into position.

4. Any groove that forms on an electrode as it wears will not be detrimental to the continuity of the fused zone of the ring weld because the ring projection self-aligns itself to the electrode.

The embodiments of the invention in which an exclusive property or privilege is claimed are defined as follows:

1. A frame and permanent magnet assembly for a dynamoelectric machine comprising, an axially extending tubular imperforate frame formed for magnetic material having an inner circular surface, said frame having a first end that has a first annular end surface that is located at an angle to said inner circular surface of said frame, a first intersection of said first annular end surface and said circular inner surface of said frame providing a first annular ridge, said frame having a second end opposite said first end of said frame that has a second annular end surface that is located at an angle to said inner circular surface of said frame, a second intersection of said second annular end surface and said circular inner surface of said frame providing a second annular ridge, a one-piece tubular imperforate magnet supporting part formed of metallic material disposed within said frame, said magnet supporting part having a plurality of axially extending and circumferentially spaced pockets, said pockets having open ends that face said inner circular surface of said frame, and a permanent magnet located in each pocket, said magnet supporting part having a first tubular end portion that is connected to a first annular portion that is engaged with said first annular end surface on said frame, a third intersection of said first tubular portion and said first annular portion providing a third annular ridge on said magnet supporting part that is aligned with said first annular ridge on said frame, said magnet supporting part having a second tubular end portion that is connected to a second annular portion that is engaged with said second annular end surface on said frame, a fourth intersection of said second tubular portion and said second annular portion providing a fourth annular ridge on said magnet supporting part that is aligned with said second annular ridge on said frame, said first and third annular ridges being welded together by a first imperforate continuous annular weld joint that extends throughout a first entire circumferential length of said first and third annular ridges, said second and fourth annular ridges being welded together by a second imperforate continuous annular weld joint that extends a second entire circumferential length of said second and fourth annular ridges, said pockets located between said first and second imperforate continuous annular weld joints, said magnet supporting part and said first and second imperforate continuous annular weld joints providing an imperforate enclosure for said permanent magnets.

2. A frame and permanent magnet assembly for a dynamoelectric machine comprising, an axially extending tubular imperforate frame formed of magnetic material having an inner circular surface, said frame having a first end that has a first annular tapered surface, a first intersection of said first annular tapered surface and said circular inner surface of said frame providing a first annular ridge, said frame having a second end opposite said first end of said frame that has a second annular tapered surface, a second intersection of said second annular tapered surface and said circular inner surface of said frame providing a second annular ridge, a one-piece tubular imperforate magnet supporting part formed of metallic material disposed within said frame, said magnet supporting part having a plurality of axially extending and circumferentially spaced pockets, said pockets having open ends that face said inner circular surface of said frame, and a permanent magnet located in each pocket, said magnet supporting part having a first tubular end portion that is connected to a first annular portion that is engaged with said first annular tapered surface on said frame, a third intersection of said first tubular portion and said first annular portion providing third annular ridge on said magnet supporting part that is aligned with said first annular ridge on said frame, said magnet supporting part having a second tubular end portion that is connected to a second annular portion that is engaged with said second annular tapered surface on said frame, a fourth intersection of said second tubular portion and said second annular portion providing a fourth annular ridge on said magnet supporting part that is aligned with said second annular ridge on said frame, said first and third annular ridges being welded together by a first imperforate continuous annular weld joint that extends throughout a first entire circumferential length of said first and third annular ridges, said second and fourth annular ridges being welded together by a second imperforate continuous annular weld joint that extends a second entire circumferential length of said second and fourth annular ridges, said pockets located between said first and second imperforate continuous annular weld joints, said magnet supporting part and said first and second imperforate continuous annular weld joints providing an imperforate enclosure for said permanent magnets.

3. The frame and magnet assembly according to claim 2 where said magnet supporting part is formed of stainless steel.

4. The frame and magnet assembly according to claim 2 wherein a shunt member formed of magnetic material is located in each of said pockets in side by side relationship with said permanent magnet.

* * * * *